United States Patent
Kamata et al.

(10) Patent No.: US 7,910,033 B2
(45) Date of Patent: Mar. 22, 2011

(54) METHOD FOR MANUFACTURING IMAGE DISPLAY DEVICE

(75) Inventors: Yusuke Kamata, Tochigi (JP); Yoshihisa Shinya, Tochigi (JP)

(73) Assignee: Sony Chemical & Information Device Corporation, Tokyo (JP)

( * ) Notice: Subject to any disclaimer, the term of this patent is extended or adjusted under 35 U.S.C. 154(b) by 0 days.

(21) Appl. No.: 12/449,796

(22) PCT Filed: Apr. 2, 2008

(86) PCT No.: PCT/JP2008/056601
§ 371 (c)(1),
(2), (4) Date: Aug. 27, 2009

(87) PCT Pub. No.: WO2008/123551
PCT Pub. Date: Oct. 16, 2008

(65) Prior Publication Data
US 2010/0003425 A1   Jan. 7, 2010

(30) Foreign Application Priority Data

Apr. 3, 2007 (JP) .................. 2007-097068
Jul. 17, 2007 (JP) .................. 2007-186360
Jan. 11, 2008 (JP) .................. 2008-005027

(51) Int. Cl.
*B29C 63/00* (2006.01)
(52) U.S. Cl. ...... 264/241; 264/494; 264/405; 156/275.5
(58) Field of Classification Search .............. 264/494, 264/405, 241; 156/275.5
See application file for complete search history.

(56) References Cited

U.S. PATENT DOCUMENTS

| 6,204,896 | B1 | 3/2001 | Matsuhira et al. |
| 6,654,083 | B1 | 11/2003 | Toda et al. |
| 2002/0131141 | A1 | 9/2002 | Saitoh |
| 2003/0006704 | A1 | 1/2003 | Morimoto et al. |
| 2006/0159867 | A1 | 7/2006 | O'Donnell |
| 2006/0272771 | A1 | 12/2006 | Suzuki et al. |

FOREIGN PATENT DOCUMENTS

| EP | 2 133 855 A1 | 12/2009 |
| JP | A-60-79388 | 5/1985 |
| JP | A-06-299126 | 10/1994 |
| JP | A-8-160407 | 6/1996 |

(Continued)

OTHER PUBLICATIONS

Office Action issued in U.S. Appl. No. 12/450,192 dated Sep. 16, 2010.

(Continued)

*Primary Examiner* — Christina Johnson
*Assistant Examiner* — Saeed M Huda
(74) *Attorney, Agent, or Firm* — Oliff & Berridge, PLC

(57) ABSTRACT

A method for manufacturing an image display device includes the step of forming a cured resin layer 15 by interposing a photo-curable resin composition between a base 2 including an image display unit such as a liquid crystal display panel 8 and a light-transmitting protection member 3 including a light-shielding member 5 and then photo-curing the photo-curable resin composition. In this method, a resin composition having a curing shrinkage ratio of 5% or less, yielding a cured product having a storage elastic modulus at 25° C. of $1.0 \times 10^7$ Pa or less, and forming the cured resin layer having a light transmittance of 90% or more in the visible range is used as the photo-curable resin composition.

9 Claims, 7 Drawing Sheets

FOREIGN PATENT DOCUMENTS

| | | |
|---|---|---|
| JP | A-09-274536 | 10/1997 |
| JP | A-10-293314 | 11/1998 |
| JP | A-2001-26758 | 1/2001 |
| JP | A-2002-040208 | 2/2002 |
| JP | A-2002-108238 | 4/2002 |
| JP | A-2002-323861 | 11/2002 |
| JP | A-2002-341317 | 11/2002 |
| JP | A-2002-341776 | 11/2002 |
| JP | A-2003-207790 | 7/2003 |
| JP | A-2004-061925 | 2/2004 |
| JP | A-2004-117545 | 4/2004 |
| JP | A-2004-224855 | 8/2004 |
| JP | A-2004-256595 | 9/2004 |
| JP | A-2005-023315 | 1/2005 |
| JP | A-2005-055641 | 3/2005 |
| JP | A-2005-179481 | 7/2005 |
| JP | A-2006-011212 | 1/2006 |
| JP | A-2006-150755 | 6/2006 |
| JP | A-2006-276105 | 10/2006 |
| JP | A-2006-292993 | 10/2006 |
| JP | A-2007-010769 | 1/2007 |
| WO | WO 2007/063751 A1 | 6/2007 |

OTHER PUBLICATIONS

U.S. Appl. No. 12/450,325, filed Sep. 22, 2009 to Toyoda et al.
U.S. Appl. No. 12/450,263, filed Aug. 27, 2009 to Kamata et al.
U.S. Appl. No. 12/450,192, filed Sep. 15, 2009 to Kamiya et al.
Extended European Search Report issued in European Patent Application No. 08739924.2 on Mar. 19, 2010.
International Search Report issued in PCT/JP2008/056818 mailed Jun. 10, 2008.
Extended European Search Report issued in European Patent Application No. 08740171.7 on Jun. 7, 2010.
International Search Report issued in PCT/JP2008/056996 mailed Jul. 1, 2008.
International Preliminary Report on Patentability issued in International Application No. PCT/JP2008/056996 on Jan. 21, 2010.
Extended European Search Report issued in European Patent Application No. 08740099.0 on Jun. 25, 2010.
Mar. 17, 2010 Supplementary European Search Report for corresponding European Patent Application No. 08739711.3.

[FIG. 1]
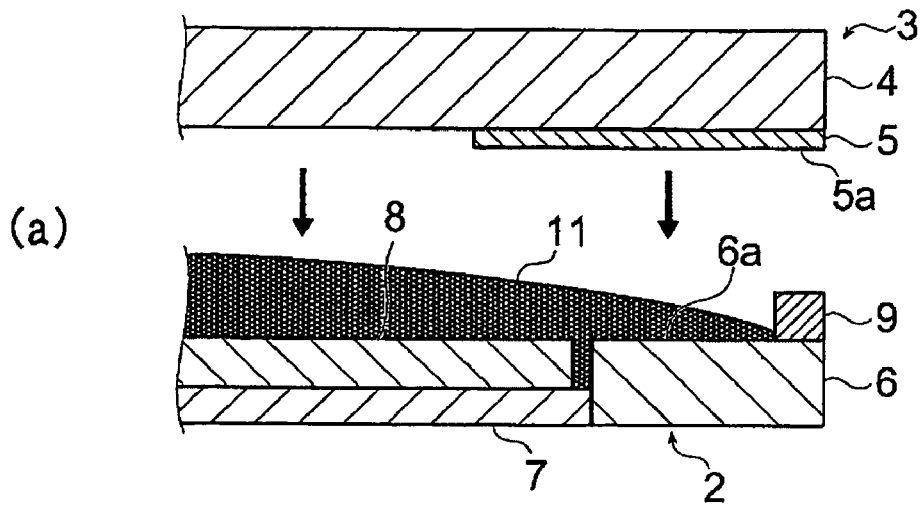
(a)
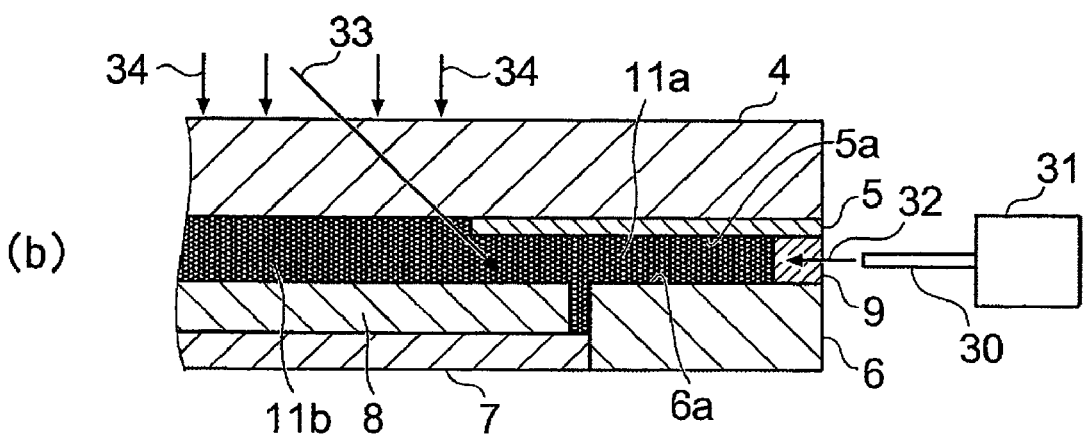
(b)
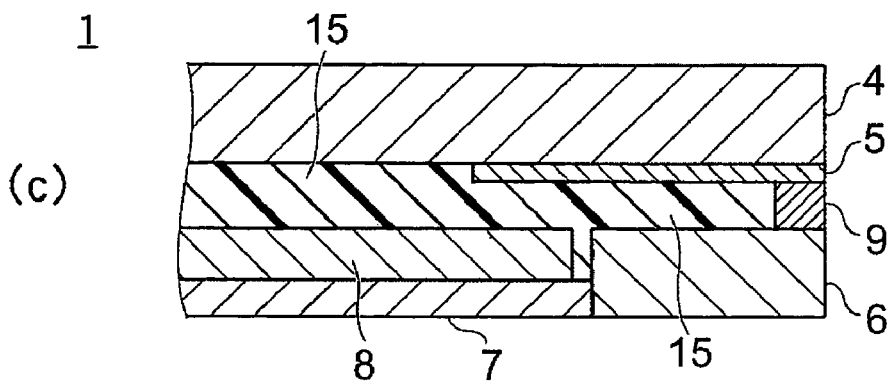
(c)

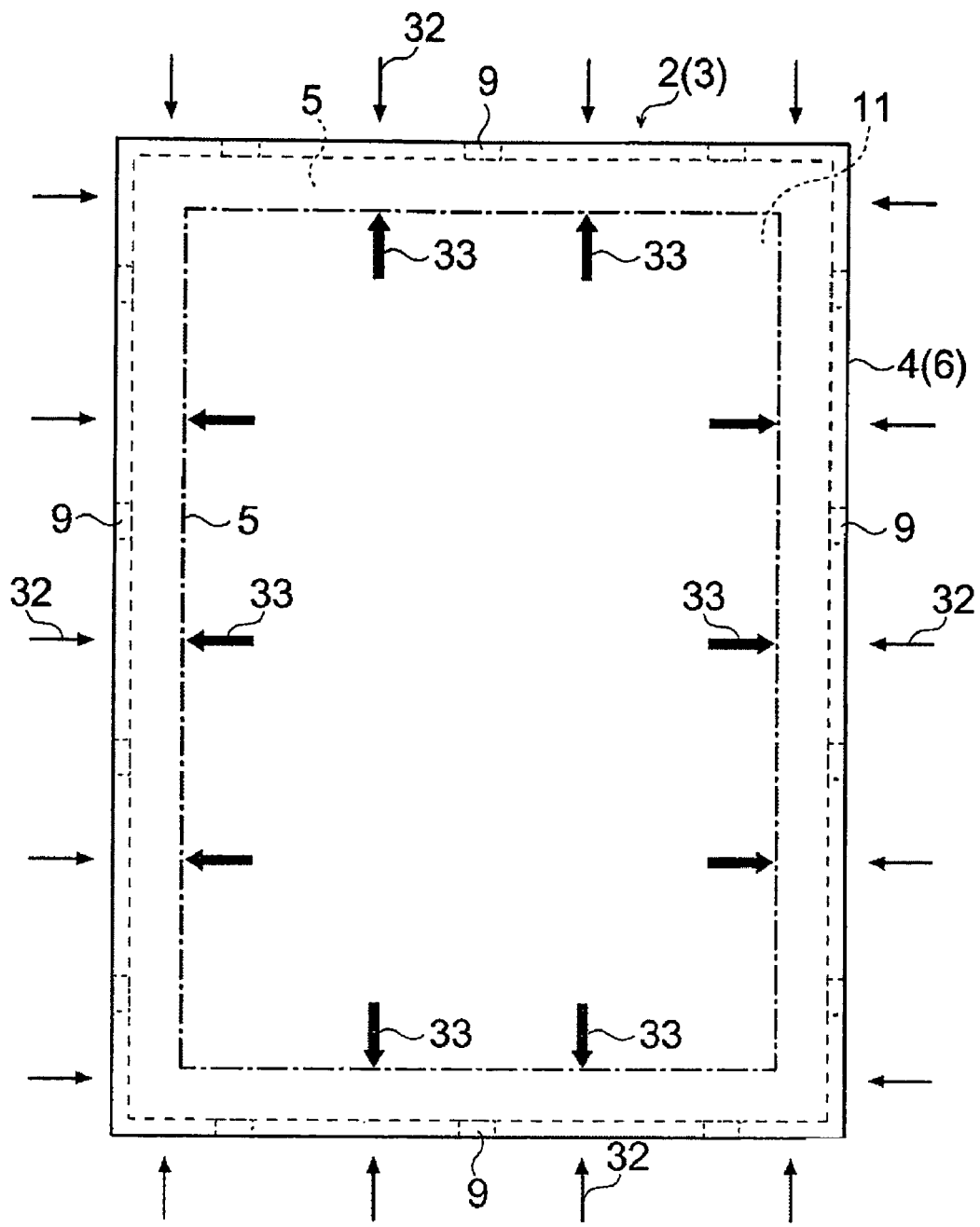
[FIG. 2]

[FIG. 3]
(a) 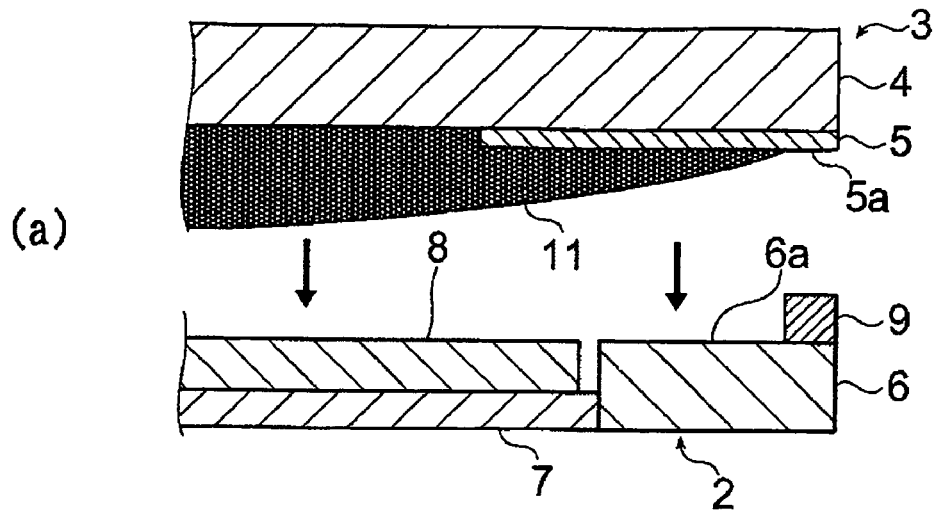
(b) 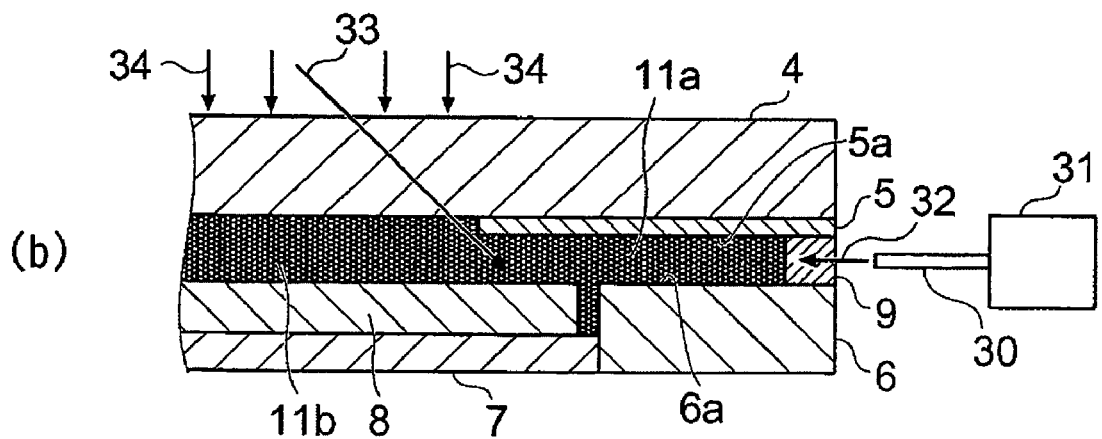
(c) 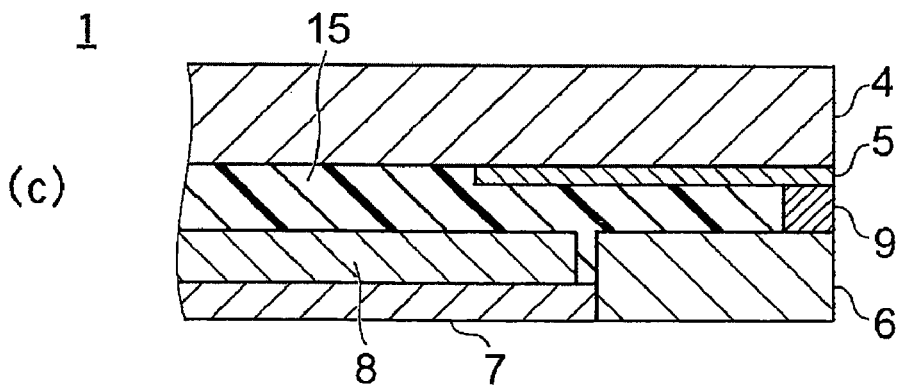

[FIG. 4]
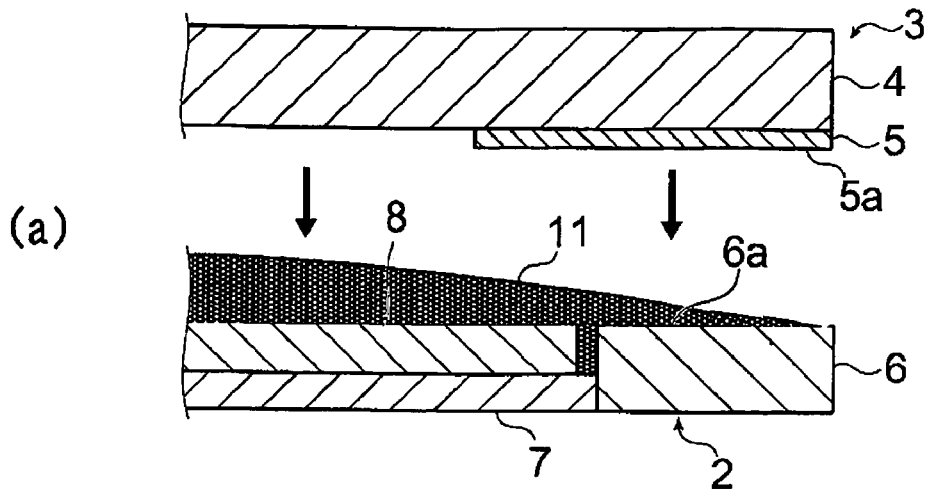
(a)
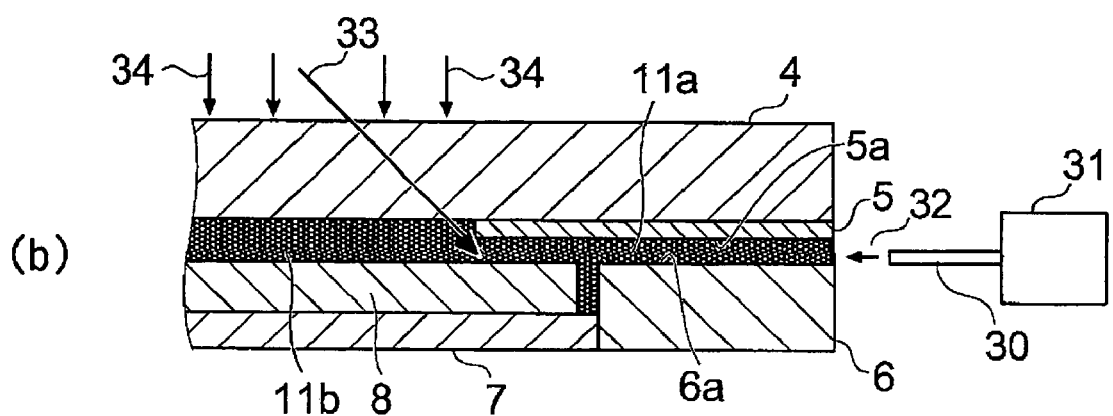
(b)
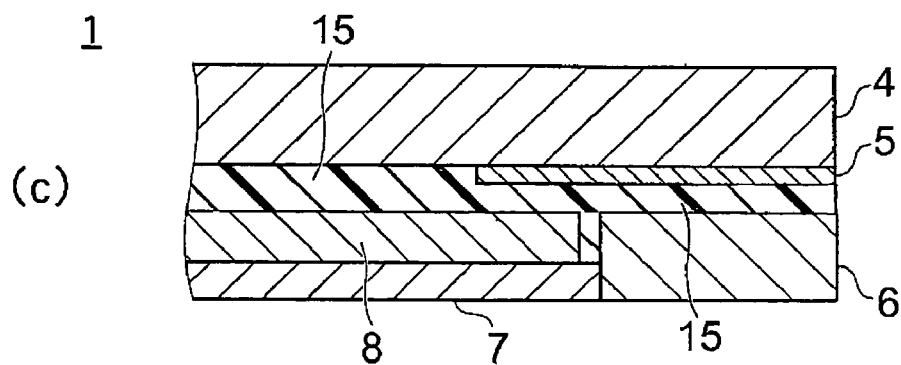
(c)

[FIG. 5]
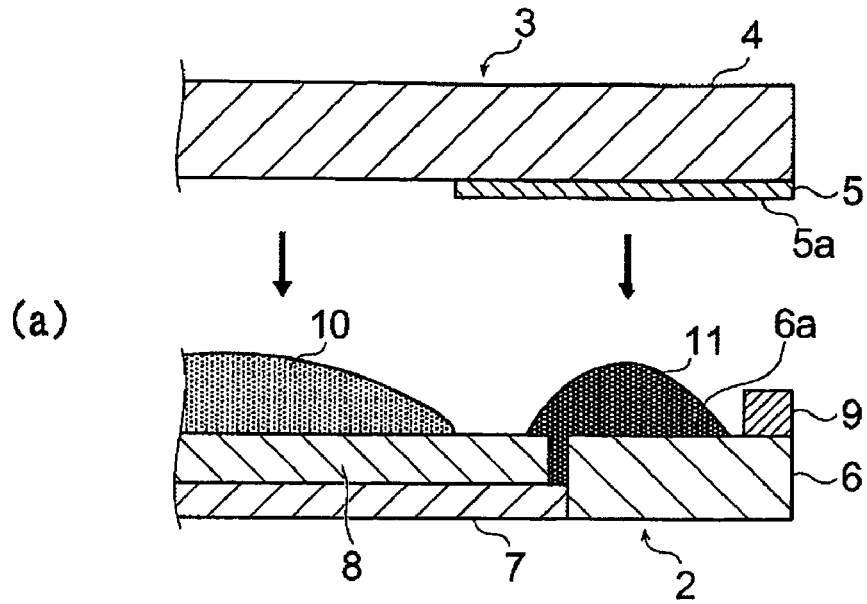
(a)
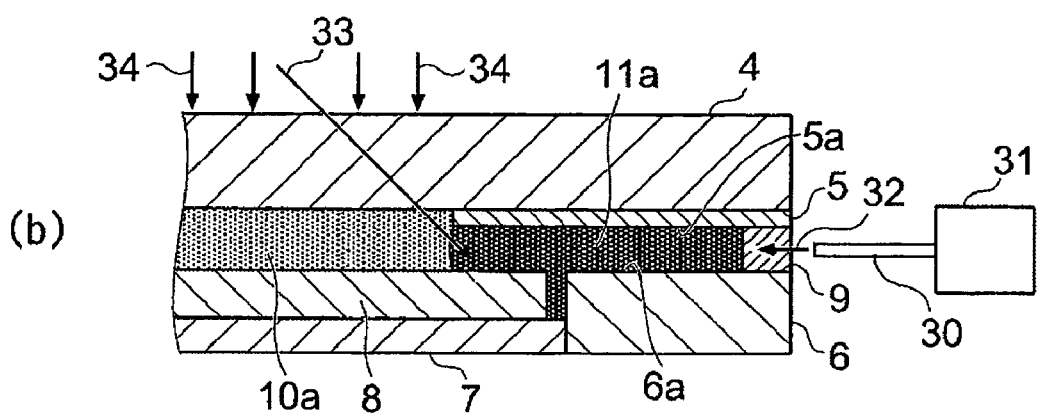
(b)
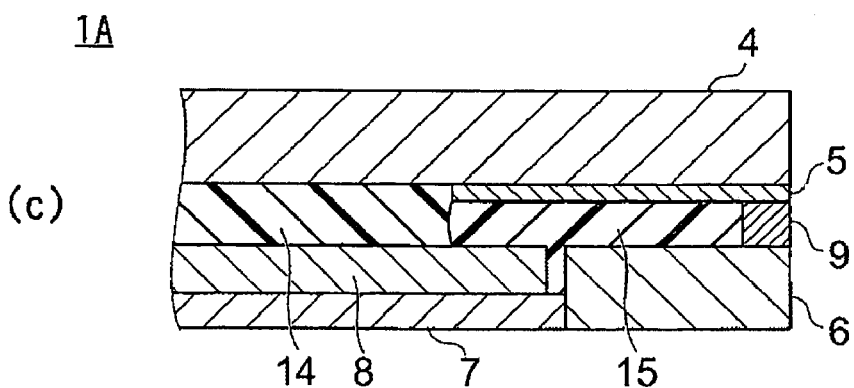
(c)

[FIG. 6]
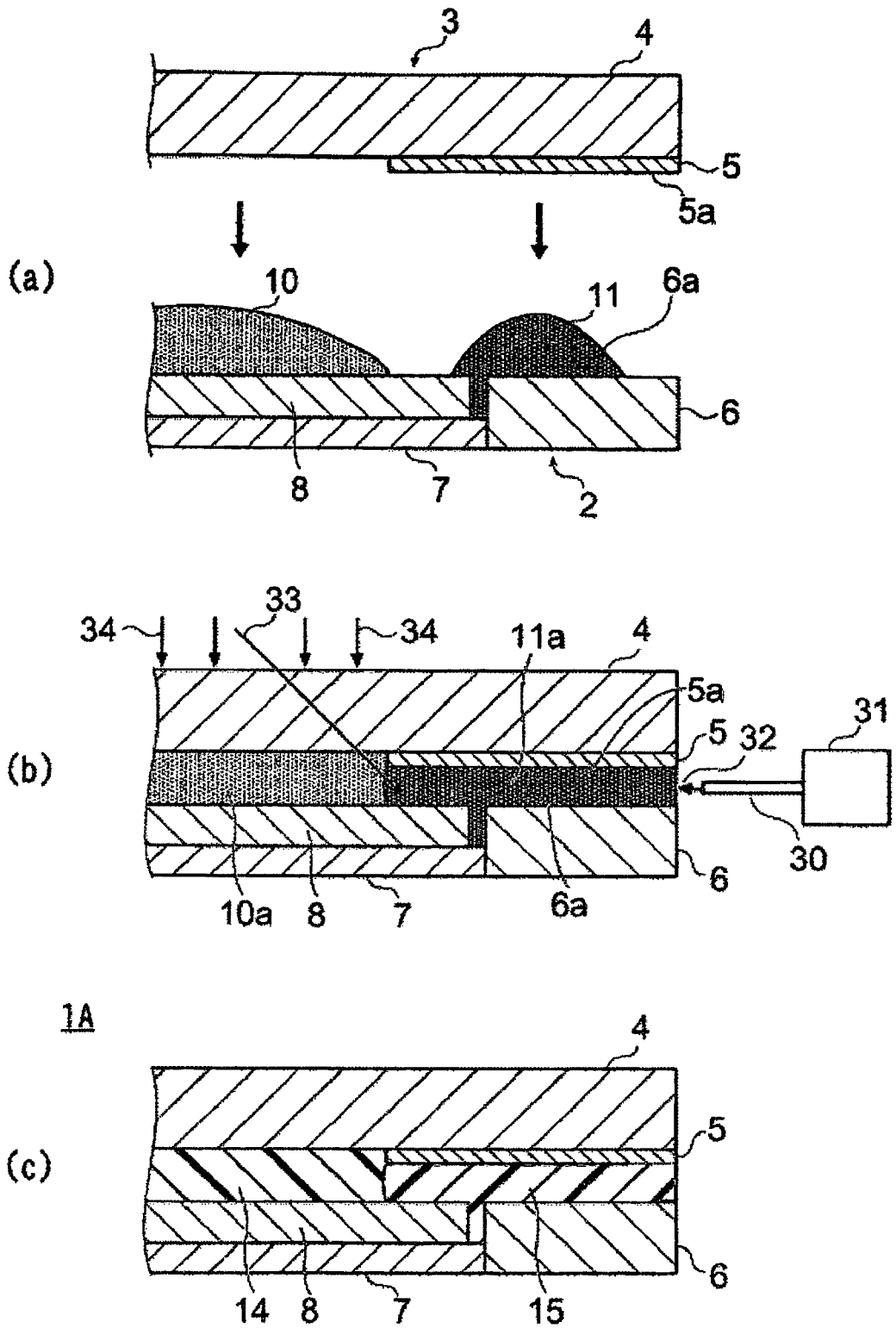

[FIG. 7]
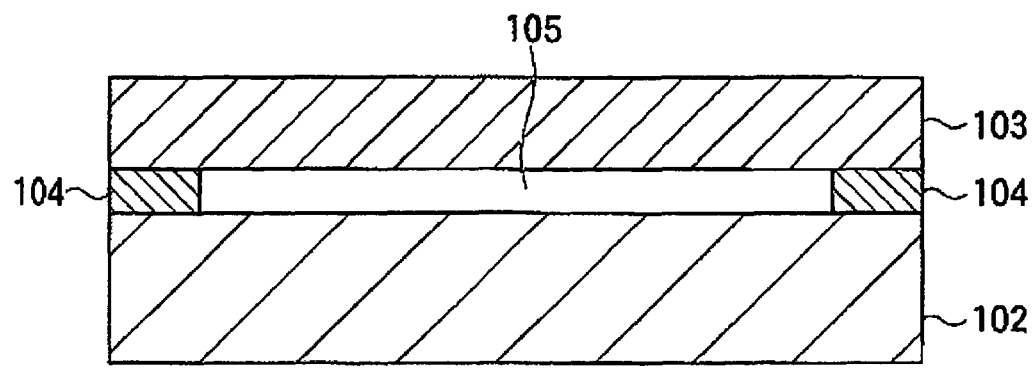

METHOD FOR MANUFACTURING IMAGE DISPLAY DEVICE

TECHNICAL FIELD

The present invention relates to a method for manufacturing an image display device such as a liquid crystal display (LCD) device used, for example, in a cellular phone, and in particular, to a method for manufacturing an image display device having a transparent protection member disposed on the image display unit.

BACKGROUND TECHNOLOGY

One conventional example of such an image display device is a liquid crystal display device 101 shown in FIG. 7. This liquid crystal display device 101 includes a transparent protection member 103 made of, for example, glass or plastic and disposed on a liquid crystal display panel 102.

In this case, to protect the surface of the liquid crystal display panel 102 and a polarizing plate (not shown), a spacer 104 is interposed between the liquid crystal display panel 102 and the protection member 103, so that a gap 105 is provided between the liquid crystal display panel 102 and the protection member 103.

However, the gap 105 present between the liquid crystal display panel 102 and the protection member 103 causes light scattering, and this results in a reduction in contrast and in brightness. The presence of the gap 105 is an obstacle to the reduction in thickness of the panel.

In view of the above problems, a technique has been proposed in which the gap between the liquid crystal display panel and the protection member is filled with a resin (for example, Patent Document 1). However, the stress during the cure shrinkage of the cured resin causes deformation of the optical glass plates sandwiching the liquid crystal of the liquid crystal display panel. This results in display defects such as irregularities in orientation of the liquid crystal material.

Moreover, to improve the brightness and contrast of displayed images, the liquid crystal display device 101 includes a black frame-like light-shielding member (so-called black matrix, not shown) that is formed on the protection member 103 so as to be situated corresponding to the peripheral portion of the liquid crystal display panel 102.

However, in such a structure, when the gap 105 between the liquid crystal display panel 102 and the protection member 103 is filled with a photo-curable resin composition and rays of light are applied to cure the resin composition, the resin composition present in an area where the light-shielding member is formed may not be cured. This is because a sufficient amount of light does not reach that area.

[Patent Document 1] Japanese Patent Application Laid-Open No. 2005-55641.

DISCLOSURE OF THE INVENTION

Problems to be Solved by the Invention

The present invention has been made in view of the problems in the conventional technologies. It is an object of the invention to provide a technique for manufacturing a thin image display device in which a resin is interposed between an image display unit and a protection member provided with a light-shielding member. This technique prevents display defects caused by the deformation of the image display unit, enables high-brightness and high-contrast image display, and allows the resin in an area where the light-shielding member is formed to be cured sufficiently.

Means for Solving the Problems

To achieve the above object, the present invention provides a method for manufacturing an image display device, the method comprising the step of forming a cured resin layer by interposing a photo-curable resin composition between a base including an image display unit and a light-transmitting protection member including a light-shielding member and then photo-curing the photo-curable resin composition, wherein a resin composition having a curing shrinkage ratio of 5% or less, yielding a cured product having a storage elastic modulus at 25° C. of $1.0 \times 10^7$ Pa or less, and forming the cured resin layer having a light transmittance of 90% or more in a visible range is used as the photo-curable resin composition, and wherein the method further comprises the step of interposing a curable resin composition containing a thermal polymerization initiator at least between the light-shielding member and the base and then heating the curable resin composition.

In one embodiment, the curable resin composition containing the thermal polymerization initiator and interposed between the light-shielding member and the base is a photo-curable resin composition, and light and heat are applied to the curable resin composition.

Further provided is another embodiment wherein in the foregoing embodiment the photo-curable resin composition interposed between the light-shielding member and the base is irradiated with rays of light from an outer side surface with respect to a forming surface of the light-shielding member.

In the present invention, the image display unit may be a liquid crystal display panel.

In the present invention, the protection member may be made of an acrylic resin.

In the present invention, the protection member may be made of an optical glass.

Effects of the Invention

In the present invention, a photo-curable resin composition is interposed between the base including the image display unit and the light-transmitting protection member including the light-shielding member and is photo-cured to form a cured resin layer. The present invention includes the step of interposing a curable resin composition containing a thermal polymerization initiator at least between the light-shielding member and the base and then heating the curable resin composition. Therefore, the resin composition can be sufficiently cured even in the area where the light-shielding member is formed.

In the present invention, the photo-curable resin composition interposed between a non-light-shielding portion and the base may not contain a thermal polymerization initiator, and the photo-curable resin composition containing the thermal polymerization initiator may be interposed only between the light-shielding member and the base. In this manner, the amount of the thermal polymerization initiator used can be reduced. In this case, the heating time and temperature can be relatively less than those when the entire portion of the curable resin composition interposed between the protection member and the base contains a thermal polymerization initiator and is heated and cured. Therefore, the influence of heat on various plastic materials used near the image display device can be reduced.

In the present invention, the photo-curable resin composition interposed between the light-shielding member and the base is irradiated with rays of light from the side surface of the area where the light-shielding member is formed. In this manner, the light is properly irradiated to the photo-curable resin composition in the area where the light-shielding member is formed, so that the photo-curable resin composition in that area can be sufficiently cured.

The internal stress accumulated during curing of the resin can be approximated by the product of the storage elastic modulus after curing and the curing shrinkage ratio. In the present invention, the photo-curable resin composition used has a curing shrinkage ratio of 5% or less and yields a cured product having a storage elastic modulus at 25° C. of $1.0 \times 10^7$ Pa or less. The use of such a photo-curable resin composition can minimize the influence of the stress during curing and shrinkage of the resin on the image display unit and the protection member. Therefore, almost no strain occurs in the image display unit and the protection member. Accordingly, a high-brightness and high-contrast image can be displayed without display defects.

In particular, when the image display unit is a liquid crystal display panel, display defects such as irregularities in orientation of the liquid crystal material can be reliably prevented, so that a high quality image can be displayed.

Moreover, in the present invention, the cured resin is interposed between the image display unit and the protection member, and this provides improved impact resistance.

In addition, a thinner image display device can be provided when compared with the conventional exemplary device in which a gap is formed between the image display unit and the protection member.

BRIEF DESCRIPTION OF THE DRAWINGS

FIG. 1 is a series of cross-sectional process views illustrating the main part of an embodiment of the method of the present invention.

FIG. 2 is a plan view illustrating the main part in the manufacturing process of an image display device in the embodiment.

FIG. 3 is a series of cross-sectional process views illustrating the main part of a modified embodiment of the embodiment.

FIG. 4 is a series of cross-sectional process views illustrating the main part of another embodiment.

FIG. 5 is a series of cross-sectional process views illustrating the main part of yet another embodiment.

FIG. 6 is a series of cross-sectional process views illustrating the main part of still another embodiment.

FIG. 7 is a cross-sectional view illustrating the main part of a conventional display device.

DESCRIPTION OF THE REFERENCE NUMERALS

1 . . . image display device
1A . . . image display device
2 . . . base
3 . . . protection member
4 . . . light-transmitting member
5 . . . light-shielding member
5a . . . bonding surface of light-shielding member
6 . . . frame
6a . . . bonding surface of frame
7 . . . backlight
8 . . . liquid crystal display panel (image display unit)
9 . . . spacer
10 . . . photo-curable resin composition
10a . . . photo-curable resin composition in the image display area
11 . . . curable resin composition that can be cured by any of light and heat
11a . . . curable resin composition in the area where the light-shielding member is formed
11b . . . photo-curable resin composition in the image display area (the area where the light-shielding member is not formed)
14 . . . cured resin layer
15 . . . cured resin layer
30 . . . irradiation unit
31 . . . UV irradiation apparatus
32, 33, 34 . . . UV rays

BEST MODE FOR CARRYING OUT THE INVENTION

Hereinafter, preferred embodiments of the present invention will be described in detail with reference to the drawings. In the drawings, the same reference numerals denote the same or like elements.

FIGS. 1(a) to 1(c) are cross-sectional process views illustrating the main part of an embodiment of the method for manufacturing an image display device according to the present invention. FIG. 2 is a plan view illustrating the main part in the manufacturing process of the image display device in the embodiment.

In the present embodiment, as shown in FIG. 1, a base 2 including an image display unit is bonded to a protection member 3 with a cured resin layer 15 interposed therebetween. The image display unit is connected to a driving circuit (not shown) and displays a predetermined image.

No particular limitation is imposed on the image display device, and the image display device can be applied to various applications. Examples of the image display device include liquid crystal display devices for cellular phones, portable game consoles, and the like. Hereinafter, the present invention will be described by way of an example of manufacturing a liquid crystal display device.

The protection member 3 is formed of, for example, a rectangular flat light-transmitting member 4 having substantially the same size as the base 2. For example, optical glass or plastic (such as acrylic resin) can be suitably used as the light-transmitting member 4.

A light-shielding member 5 having, for example, a black frame-like shape is disposed on the base 2 side surface of the light-transmitting member 4 so as to be positioned in a region corresponding to the periphery of a liquid crystal display panel 8. The light-shielding member 5 is formed as a layer having a uniform thickness using, for example, a printing method.

The base 2 includes a frame 6 having, for example, a frame-like shape. The liquid crystal display panel (image display unit) 8 is attached to the inner region defined by the frame 6, and a backlight 7 is attached to the rear side of the liquid crystal display panel 8.

A plurality of spacers 9 are intermittently disposed at predetermined regular intervals on the peripheral portion on the image display side of the frame 6 as shown in FIG. 2. The thickness of the spacers 9 is about 0.05 to about 1.5 mm, so that the distance between the surfaces of the liquid crystal display panel 8 and the protection member 3 is maintained at about 1 mm.

In particular, in the present embodiment, the bonding surface 6a of the frame 6 of the base 2 is parallel to the bonding surface 5a of the light-shielding member 5 of the protection member 3.

In the present embodiment, before the protection member 3 and the base 2 are bonded together, a predetermined amount of a curable resin composition 11 that can be cured by light and heat is applied dropwise to an inner area on the base 2 that is defined by the spacers 9, as shown in FIG. 1(a).

Preferably, the amount thereof applied dropwise is adjusted such that the thickness of the cured resin layer 15 is 50 to 200 μm after the protection member 3 and the base 2 are bonded together.

The curable resin composition 11 is prepared such that the cured product of the resin has a storage elastic modulus (25° C.) of $1\times10^7$ Pa or less and preferably $1\times10^3$ to $1\times10^6$ Pa, and a refractive index of preferably 1.45 or more and 1.55 or less and more preferably 1.51 or more and 1.52 or less. In addition, the curable resin composition 11 is prepared such that, when the thickness of the cured product of the resin is 100 μm, the transmittance in the visible range is 90% or more.

Generally, a curable resin composition containing the same main resin component as that of the curable resin composition 11 may yield a cured product having a storage elastic modulus (25° C.) exceeding $1\times10^7$ Pa when different co-present resin, monomer, and other components are used. A resin composition yielding such a cured product is not used as the curable resin composition 11.

Moreover, the curable resin composition 11 is prepared such that the curing shrinkage ratio is preferably 5.0% or less, more preferably 4.5% or less, particularly preferably 4.0% or less, and most preferably 0 to 2%. In this manner, the internal stress accumulated in the cured resin when the curable resin composition 11 is cured can be reduced, and the occurrence of strain at the interface between the cured resin layer 15 and the liquid crystal display panel 8 or the protection member 3 can be prevented. Therefore, when the curable resin composition 11 is interposed between the liquid crystal display panel 8 and the protection member 3 and is cured, the cured product can reduce light scattering generated at the interface between the cured resin layer 15 and the liquid crystal display panel 8 or the protection member 3. This can increase the brightness of the displayed image and improve visibility.

The amount of internal stress accumulated in the cured product of a resin composition during curing can be evaluated by the average surface roughness of the cured resin obtained by applying dropwise the resin composition to a flat plate and curing the applied resin composition. For example, 2 mg of a resin composition is applied dropwise to a glass or acrylic plate and cured by UV irradiation to a cure ratio of 90% or more. When the average surface roughness of the resultant cured resin is 6.0 nm or less, the interfacial strain caused by the cured product of the curable resin composition interposed between the liquid crystal display panel 8 and the protection member 3 is practically negligible. With the curable resin composition 11 used in the present embodiment, the average surface roughness can be 6.0 nm or less, preferably 5.0 nm or less, and more preferably 1 to 3 nm. Therefore, the strain generated at the interfaces of the cured resin is practically negligible.

Any glass plate used for sandwiching the liquid crystal of a liquid crystal cell or used as the protection plate for a liquid crystal cell may be preferably used as the above glass plate. Any acrylic plate used as the protection plate for a liquid crystal cell may be preferably used as the above acrylic plate. The average surface roughness of such glass and acrylic plates is typically 1.0 nm or less.

The curable resin composition 11 used contains, as main components, an oligomer or polymer, an acrylate monomer, a photo polymerization initiator, and a thermal polymerization initiator. This resin composition 11 may further contain other additives such as a sensitizer, a plasticizer, and transparent particles in amounts within the range of the object of the invention.

Examples of the oligomer or polymer that can be suitably used include polyurethane acrylate, polybutadiene acrylate, polyisoprene acrylate, esterified products thereof, hydrogenated terpene resin, butadiene polymers, and epoxy acrylate oligomers.

Examples of the acrylate monomer that can be suitably used include isobornyl acrylate, dicyclopentenyloxyethyl methacrylate, hydroxymethyl methacrylate, hydroxypropyl methacrylate, hydroxybutyl methacrylate, lauryl acrylate, and benzyl acrylate.

Examples of the photo polymerization initiator that can be suitably used include, but are not limited to, 1-hydroxy-cyclohexyl-phenyl-ketone(trade name: IRGACURE 184, product of Ciba Specialty Chemicals), 2-hydroxy-1-{4-[4-(2-hydroxy-2-methyl-propionyl)-benzyl]phenyl}-2-methyl-propane-1-one (trade name: IRGACURE 127, product of Ciba Specialty Chemicals), and 1-hydroxy-cyclohexyl-phenyl-ketone (trade name DAROCUR 1173, product of Ciba Specialty Chemicals).

The protection member 3 may have a UV cut function to protect the display unit from UV rays.
In such a case, it is preferable to use, as the photo polymerization initiator used in the present invention, a photo polymerization initiator that can initiate curing in the visible range (for example, trade name: SpeedCure TPO, product of Nihon SiberHegner K.K.).

An organic peroxide or the like that serves as an initiator activated by heat can be preferably used as the thermal polymerization initiator. When a liquid crystal display panel 8 is used as an image display unit as in the present embodiment, a plastic material such as an acrylic resin is often used as the material for the panel. Since such a plastic material has a heat resistance of up to about 80° C., it is preferable to use, as the thermal polymerization initiator, an organic peroxide having a ten-hour half-life temperature of 100° C. or less.

The half-life of the organic peroxide is the time until the concentration of the organic peroxide is reduced to one-half the initial value, and the temperature at which the half-life is 10 hours is referred to as the ten-hour half-life temperature.

Examples of the thermal polymerization initiator having a ten-hour half-life temperature of 100° C. or less include PERBUTYL O (trade name: $C_{12}H_{24}O_3$ product of NOF Corporation) and PEROYL TCP (trade name: $C_{12}H_{24}O_3$, product of NOF Corporation). The trade names PERBUTYL and PEROYL are registered trademarks.

To ensure appropriate reaction temperature and reaction time, the amount of the thermal polymerization initiator added is preferably 1 to 10 percent by weight based on the weight of the acrylic resin in the curable resin composition 11.

Next, as shown in FIG. 1(b), the protection member 3 is disposed on the spacers 9 of the base 2, and the rear face of the protection member 3 is brought into contact with the curable resin composition 11, so that the curable resin composition 11 is interposed in the gap between the base 2 and the protection member 3.

Subsequently, as shown in FIG. 1(b), the curable resin composition 11b in an image display area that corresponds to the area where the light-shielding member 5 is not formed is irradiated with UV rays 34 through the light-transmitting member 4.

No particular limitation is imposed on the irradiation direction of the UV rays 34. Preferably, to uniformly cure the curable resin composition 11b in the image display area, the irradiation direction of the UV rays 34 is perpendicular to the surface of the light-transmitting member 4.

At the same time with the irradiation with the UV rays 34, UV rays 32 may be directly irradiated to curable resin composition 11a disposed between the light-shielding member 5 and the base 2 (i.e., the curable resin composition disposed in the area where the light-shielding member 5 is formed) using a UV irradiation apparatus 31 including a small irradiation unit 30 composed of, for example, optical fibers. More specifically, the UV rays 32 may be directly irradiated to the curable resin composition 11a from the outer side surface with respect to the bonding surface 5a of the light-shielding member 5 (i.e., the forming surface of the light-shielding member) through the gaps between the spacers 9 that are formed between the frame 6 and the light-shielding member 5, as shown in FIGS. 1(b) and 2.

No particular limitation is imposed on the irradiation direction of the UV rays 32. The irradiation direction may be inclined to the horizontal direction by 0° or more and 90° or less. Preferably, to facilitate uniform curing of the photo-curable resin composition 11a in the area where the light-shielding member 5 is formed, the UV rays 32 are irradiated so as to be substantially parallel to the bonding surface 6a of the frame 6 of the base 2 and to the bonding surface 5a of the light-shielding member 5 of the protection member 3.

In addition to the irradiation of the UV rays 34, the curable resin composition 11a between the light-shielding member 5 and the base 2 may be irradiated with UV rays 33 using a UV irradiation apparatus (not shown) from the inner side surface with respect to the bonding surface 5a of the light-shielding member 5 through the light-transmitting member 4, as shown in FIGS. 1(b) and 2.

In this case, in consideration of the efficiency of the irradiation with the UV rays 33 of the curable resin composition 11a between the light-shielding member 5 and the base 2 and other factors, it is preferable that the irradiation direction of the UV rays 33 be inclined upwardly to the bonding surface 6a of the frame 6 of the base 2 or to the bonding surface 5a of the light-shielding member 5 of the protection member 3 by an angle of 10° to 45°.

When the curable resin composition 11a in the area where the light-shielding member 5 is formed is sufficiently heated (this process is described below), the irradiation with the UV rays 32 and UV rays 33 may be omitted.

In the present embodiment, the curable resin composition 11a in the area where the light-shielding member 5 is formed is heated at the same time, before, or after the irradiation with the UV rays 34 to the curable resin composition 11b in the image display area.

In this case, no particular limitation is imposed on the heating temperature. To prevent, for example, the deformation of the components made of a plastic material, the heating temperature is preferably 60 to 100° C. The heating may be performed by placing the image display device on a heating stage during or after the irradiation with UV rays to heat the curable resin compositions 11a and 11b as a whole or by placing a heater at the area where the light-shielding member 5 is formed, with the area surrounding the liquid crystal display panel 8.

By irradiating both the curable resin composition 11b in the image display area and the curable resin composition 11a in the area where the light-shielding member 5 is formed with the UV rays 32, UV rays 33, and UV rays 34, and heating them in the manner described above, both the curable resin compositions 11a and 11b are cured to form the cured resin layer 15, as shown in FIG. 1(c), whereby the target image display device 1 is obtained.

In the present embodiment described above, the curable resin composition 11 containing both the photo polymerization initiator and the thermal polymerization initiator is used in the step of bonding the protection member 3 and the base 2 together. In the bonding step, the curable resin composition 11b in the image display area is irradiated with the UV rays 34 through the light-transmitting member 4, and the curable resin composition 11a in the area where the light-shielding member 5 is formed is heated. If necessary, the curable resin composition 11 is irradiated with the UV rays 32 and UV rays 33 from the inner and outer side surfaces with respect to the bonding surface 5a of the light-shielding member 5. In this manner, not only the curable resin composition 11b in the image display area but also the curable resin composition 11a in the area where the light-shielding member 5 is formed can be sufficiently cured.

Moreover, the use of the particular curable resin composition 11 can minimize the influence of the stress caused by the cure shrinkage of the resin on the liquid crystal display panel 8 and the protection member 3, as described above. Therefore, almost no strain occurs in the liquid crystal display panel 8 and the protection member 3, so that the liquid crystal display panel 8 is not deformed. This allows high-brightness and high-contrast image display without display defects.

In addition, the cured resin layer 15 formed by curing the curable resin composition 11 allows to provide a shock-resistant image display device 1 that is thinner than that of the conventional example in which a gap is formed between the image display unit and the protection member.

In the above embodiment, a predetermined amount of the photo- and heat-curable resin composition 11 is applied dropwise to the inner area on the base 2 that is surrounded by the spacers 9. However, for example, as shown in FIG. 3(a), a predetermined amount of the curable resin composition 11 may be applied dropwise to one side of the protection member 3 on the light-shielding member 5 side. Then, the protection member 3 is turned upside down and bonded to the base 2.

In such a case, the curable resin composition 11 may be cured with light and heat as in the above embodiment, as shown in FIGS. 3(b) and 3(c).

As shown in FIG. 4, an image display device 1 having no spacers 9 may be manufactured. In this case, the curable resin composition 11 is applied to the base 2, and the protection member 3 is placed on the applied resin composition. The resin composition is cured with light and heat in the same manner as described above.

FIGS. 5(a) to 5(c) are cross-sectional process views illustrating the main part of yet another embodiment. The parts corresponding to those of the above embodiment are denoted by the same reference numerals, and the detailed description thereof will be omitted.

As shown in FIG. 5(a), the base 2 and the protection member 3 configured as above are used also in the present embodiment.

In the present embodiment, first, a predetermined amount of a photo-curable resin composition 10 is applied dropwise to the liquid crystal display panel 8 of the base 2. This photo-curable resin composition 10 is the same as the above photo- and heat-curable resin composition 11 except that the thermal polymerization initiator is not added.

Next, as shown in FIG. 5(a), a predetermined amount of the photo- and heat-curable resin composition 11 is applied dropwise to an inner area on the base 2 that is surrounded by the spacers 9 and faces the light-shielding member 5 of the protection member 3 (in the present embodiment, this area extends over the frame 6 and the liquid crystal display panel 8).

Then, as shown in FIG. 5(a), the protection member 3 is disposed on the spacers 9 of the base 2 such that the rear face of the protection member 3 comes in contact with the photo-curable resin composition 10a in the image display area and with the curable resin composition 11a in the area where the light-shielding member is formed.

Subsequently, as shown in FIG. 5(b), the photo-curable resin composition 10a in the image display area is irradiated with UV rays 34 through the light-transmitting member 4.

If necessary, at the same time with the application of the UV rays 34, the curable resin composition 11a disposed between the light-shielding member 5 and the base 2 may be directly irradiated with UV rays 32 using the UV irradiation apparatus 31 under the conditions described above. More specifically, the curable resin composition 11a may be directly irradiated with the UV rays 32 from the outer side surface with respect to the bonding surface 5a of the light-shielding member 5, i.e., through the gaps between the spacers 9 that are formed between the frame 6 and the light-shielding member 5, as shown in FIG. 5(b).

The curable resin composition 11a between the light-shielding member 5 and the base 2 may be irradiated with UV rays 33 using a UV irradiation apparatus (not shown) from the inner side surface with respect to the bonding surface 5a of the light-shielding member 5 through the light-transmitting member 4.

The resin can be rapidly and reliably cured by the irradiation with the UV rays 32 and UV rays 33.

Also in the present embodiment, at least the curable resin composition 11a between the light-shielding member 5 and the base 2 is heated.

By irradiating the resin with the UV rays 34, heating it, and, if necessary, irradiating it with the UV rays 32 and UV rays 33, the photo-curable resin composition 10a in the image display area and the curable resin composition 11a in the area where the light-shielding member 5 is formed are cured to form cured resin layers 14 and 15, as shown in FIG. 5(c), whereby a target image display device 1A is obtained.

In the present embodiment, in addition to the effects described in the preceding embodiment, the amount of the thermal polymerization initiator used can be reduced, as the curable resin composition 11 containing the thermal polymerization initiator is disposed only between the frame 6 of the base 2 and the light-shielding member 5 and is cured. Moreover, the heating time can be made shorter and the heating temperature can be made lower relatively when compared with the case where the entire portion of the curable resin composition interposed between the protection member 3 and the base 2 contains the thermal polymerization initiator and is cured with heat. Therefore, the influence of heat on the plastic material or other parts constituting the image display device is advantageously small. In addition, the same effects as in the preceding embodiment can also be obtained.

Also in the present embodiment, as shown in FIG. 6, an image display device 1A having no spacers 9 may be manufactured.

The present invention is not limited to the embodiments described above, and various modifications may be made thereto. For example, the irradiation with UV rays to the curable resin composition in the image display area and the irradiation with UV rays to the curable resin composition in the area where the light-shielding member is formed may be performed at the same time or in separate steps.

The curable resin composition 11a may be placed in the area where the light-shielding member is formed such that a void portion is formed in part in the side portion between the bonding surfaces 6a and 5a of the frame 6 and the light-shielding member 5. In this manner, when the UV rays 32 are irradiated from the outer side surface with respect to the forming surface of the light-shielding member, the UV rays can reliably reach the resin composition, so that the resin composition is sufficiently cured.

Moreover, the present invention is applicable not only to liquid crystal display devices but also to various panel displays such as organic EL and plasma display devices.

EXAMPLES

Hereinafter, the present invention will be specifically described by way of Examples, but the invention in not limited to the Examples.

The following resin compositions a to h were prepared.
<Resin Composition a>

50 Parts by weight of polyurethane acrylate (trade name: UV-3000B, product of Nippon Synthetic Chemical Industry Co., Ltd.), 30 parts by weight of isobornyl acrylate (trade name: IBXA, product of Osaka Organic Chemical Industry Ltd.), 5 parts by weight of organic peroxide (trade name: PERBUTYL O, product of NOF Corporation), 3 parts by weight of a photo polymerization initiator (trade name: IRGACURE 184, product of Ciba Specialty Chemicals), and 1 part by weight of a photo polymerization initiator (trade name: SpeedCure TPO, product of Nihon SiberHegner K.K.) were kneaded using a kneader to prepare a resin composition a.
<Resin Composition b>

50 Parts by weight of polyurethane acrylate (trade name: UV-3000B, product of Nippon Synthetic Chemical Industry Co., Ltd.), 30 parts by weight of isobornyl acrylate (trade name: IBXA, product of Osaka Organic Chemical Industry Ltd.), 3 parts by weight of a photo polymerization initiator (trade name: IRGACURE 184, product of Ciba Specialty Chemicals), and 1 part by weight of a photo polymerization initiator (trade name: SpeedCure TPO, product of Nihon SiberHegner K.K.) were kneaded using a kneader to prepare a resin composition b without adding an organic peroxide.
<Resin Composition c>

70 Parts by weight of an esterified product of 2-hydroxyethyl methacrylate and a maleic anhydride adduct of polyisoprene polymer, 30 parts by weight of dicyclopentenyloxyethyl methacrylate, 10 parts by weight of 2-hydroxybutyl methacrylate, 30 parts by weight of hydrogenated terpene resin, 140 parts by weight of butadiene polymer, 4 parts by weight of a photo polymerization initiator, and 0.5 parts by weight of a photo polymerization initiator for visible light were kneaded using a kneader to prepare a resin composition c.
<Resin Composition d>

100 Parts by weight of an esterified product of 2-hydroxyethyl methacrylate and a maleic anhydride adduct of polyisoprene polymer, 30 parts by weight of dicyclopentenyloxyethyl methacrylate, 10 parts by weight of 2-hydroxybutyl methacrylate, 30 parts by weight of hydrogenated terpene resin, 210 parts by weight of butadiene polymer, 7 parts by weight of a photo polymerization initiator, and 1.5 parts by weight of a photo polymerization initiator for visible light were kneaded using a kneader to prepare a resin composition d.

<Resin Composition e>

70 Parts by weight of an esterified product of 2-hydroxyethyl methacrylate and a maleic anhydride adduct of polyisoprene polymer (trade name: UC-203, product of Kuraray Co., Ltd.), 30 parts by weight of dicyclopentenyloxyethyl methacrylate (trade name: FA512M, product of Hitachi Chemical Co., Ltd.), 10 parts by weight of 2-hydroxybutyl methacrylate (trade name: LIGHT-ESTER HOB, product of Kyoeisha Chemical Co., Ltd.), 30 parts by weight of hydrogenated terpene resin (trade name: Clearon P-85, product of Yasuhara Chemical Co., Ltd.), 35 parts by weight of butadiene polymer (trade name: Polyoil 110, product of ZEON corporation), 5 parts by weight of a photo polymerization initiator (trade name: IRGACURE 184D, product of Ciba Specialty Chemicals), and 2 parts by weight of a photo polymerization initiator (trade name: SpeedCure TPO, product of Nihon SiberHegner K.K.) were kneaded using a kneader to prepare a resin composition e.

<Resin Composition f>

50 Parts by weight of polybutadiene acrylate, 20 parts by weight of hydroxyethyl methacrylate, 3 parts by weight of a photo polymerization initiator, and 1 part by weight of a photo polymerization initiator for visible light were kneaded using a kneader to prepare a resin composition f.

<Resin Composition g>

50 Parts by weight of polyurethane acrylate (trade name: UV-3000B, product of Nippon Synthetic Chemical Industry Co., Ltd.), 30 parts by weight of tricyclodecane dimethanol acrylate (trade name: NK ESTER LC2, product of Shin-Nakamura Chemical Co., Ltd.), 3 parts by weight of a photo polymerization initiator (trade name: IRGACURE 184, product of Ciba Specialty Chemicals), and 1 part by weight of a photo polymerization initiator (trade name: SpeedCure TPO, product of Nihon SiberHegner K.K.) were kneaded using a kneader to prepare a resin composition g.

<Resin Composition h>

50 Parts by weight of polybutadiene acrylate (trade name: TE-2000, product of Nippon Soda Co., Ltd.), 20 parts by weight of isobornyl acrylate (trade name: IBXA, product of Osaka Organic Chemical Industry Ltd.), 3 parts by weight of a photo polymerization initiator (IRGACURE 184, product of Ciba Specialty Chemicals), and 1 part by weight of a photo polymerization initiator (trade name: SpeedCure TPO, product of Nihon SiberHegner K.K.) were kneaded using a kneader to prepare a resin composition h.

Experimental Example 1-1

Cure Ratio of Resin Compositions

The resin compositions a and b (0.2 g each) were applied dropwise to the inner areas, surrounded by spacers, on liquid crystal display substrates as shown in FIG. 1(a), and acrylic plates each having a 2.0-mm wide light-shielding member and serving as a protection member were placed on the spacers. The resin compositions were photo-cured under conditions A to D described below, whereby liquid crystal display devices were produced as shown in Table 1.

The acrylic plates were removed from the obtained liquid crystal display devices, and the cure ratios of the cured products of the resin compositions a and b were measured in the manner described later. The results are shown in Table 1.

Curing Conditions A:

The resin composition was irradiated with UV rays at an integrated light quantity of 5,000 mJ using a UV lamp (product of USHIO Inc.) placed at a position about 10 cm away from the acrylic plate to be photo-cured, whereby a liquid crystal display device was produced.

Curing Conditions B:

In addition to the irradiation conditions in the curing conditions A, a heater was placed around the frame, and heating was performed at 80° C. for 60 minutes.

Curing Conditions C:

In addition to the irradiation conditions in the curing conditions A, the entire periphery of the frame having the light-shielding member of the liquid crystal display device formed thereon was irradiated with UV rays at an integrated light quantity of 5,000 mJ using optical fibers placed about 3 cm away from the frame.

Curing Conditions D:

In addition to the irradiation conditions in the curing conditions A, the liquid crystal display device was placed on a heating stage and heated at 80° C. for 60 minutes, and the entire periphery of the frame having the light-shielding member of the liquid crystal display device formed thereon was irradiated with UV rays at an integrated light quantity of 5,000 mJ using optical fibers placed about 3 cm away from the frame.

Method for Measuring Cure Ratio:

The curable components (monomer and oligomer) were extracted from each of the resin composition before the irradiation and the cured product of the irradiated resin composition with acetonitrile in an amount giving a concentration of the resin composition or the cured product of 0.2 wt %. The peak intensity $I_0$ of the curable components in the resin composition and the peak intensity $I_1$, of the curable components in the cured product were determined by liquid chromatography, and the cure ratio was computed using the following equation.

$$\text{Cure ratio (\%)} = (I_0 - I_1)/I_0 \times 100 \qquad [\text{Equation 1}]$$

Experimental Example 1-2

The same procedure as in Experimental Example 1-1 was repeated except that an acrylic plate having a 5.0 mm-wide light-shielding member was used as the protection member. Liquid crystal display devices were produced using the resin compositions a and b under different curing conditions, and the cure ratio of the cured resin in each of the obtained liquid crystal devices was measured. The results are shown in Table 2.

TABLE 1

Experimental Example 1-1 (Light-shielding member: 2 mm)

| Liquid crystal display device (resin composition) | Curing conditions | Cure ratio of resin composition | |
|---|---|---|---|
| | | Central portion of display unit | Directly below light-shielding member (2 mm) |
| Resin composition a | A | 95% | 50% |
| | B | 95% | 95% |
| | C | 95% | 95% |
| | D | 95% | 95% |
| Resin composition b | A | 95% | 50% |
| | C | 95% | 95% |

Curing conditions A: Only the irradiation with UV rays from the acrylic plate side.

Curing conditions B: The irradiation with UV rays from the acrylic plate side and heating using a heater.
Curing conditions C: The irradiation with UV rays from the acrylic plate side and the irradiation with UV rays from the side surface sides.
Curing conditions D: The irradiation with UV rays from the acrylic plate side, heating using a heating stage, and the irradiation with UV rays from the side surface sides.

TABLE 2

Experimental Example 1-2 (Light-shielding member: 5 mm)

| Liquid crystal display device (resin composition) | Curing conditions | Cure ratio of resin composition | |
|---|---|---|---|
| | | Central portion of display unit | Directly below light-shielding member (5 mm) |
| Resin composition a | A | 95% | 50% |
| | B | 95% | 95% |
| | C | 95% | 95% |
| | D | 95% | 95% |
| Resin composition b | A | 95% | 50% |
| | C | 95% | 75% |

Curing conditions A to D: The same as the curing conditions in Table 1.

As is clear from Tables 1 and 2, when the resin composition was irradiated with UV rays only from the acrylic plate side (curing conditions A), the cure ratio of the resin composition a containing both the photo polymerization initiator and the thermal polymerization initiator and the cure ratio of the resin composition b containing the photo polymerization initiator but not containing the thermal polymerization initiator were satisfactory in the central portion of the image display unit. However, the resin compositions a and b were not sufficiently cured directly below the light-shielding member irrespective of the width thereof.

Suppose the case where the resin composition was irradiated with UV rays from the acrylic plate side and from the side surface sides (curing conditions C). In this case, the curing properties were satisfactory both in the central portion of the image display unit and directly below the light-shielding member when the width of the light-shielding member was small (2 mm). However, when the width of the light-shielding member was large (5 mm), the cure ratio directly below the light-shielding member was low (75%, see the results for the resin composition b under the curing conditions C in Table 2).

When the resin composition a was used and both the irradiation with UV rays and heating were performed (curing conditions B and D), the cure ratios of the resin composition in the central portion of the image display unit and directly below the light-shielding member were improved to 95% irrespective of the width of the light-shielding member, and the obtained results were very good.

Experimental Example 2

Measurement of Various Properties of Cured Resins

The resin compositions a to g were applied dropwise to white glass plates having a thickness of 100 µm so as to have a predetermined thickness. The glass plates were carried into a UV conveyer, whereby the cured products of the resins having a predetermined thickness were obtained. These were used as samples. Each of the samples was measured for "light transmittance," "storage elastic modulus," "curing shrinkage ratio," and "surface roughness," as follows.

[Light Transmittance]

The light transmittance in the visible range was measured for each sample (the thickness of the cured resin: 100 µm) using an ultraviolet and visible spectrophotometer (V-560, product of JASCO Corporation) and was found to be 90% or more for all the samples.

[Storage Elastic Modulus]

The storage elastic modulus (Pa, 25° C.) was measured for each sample at a measurement frequency of 1 Hz using a viscoelasticity measuring apparatus (DMS 6100, product of Seiko Instruments Inc.). The obtained results are shown in Table 3.

[Curing Shrinkage Ratio]

The specific gravities of the uncured liquid resin and the cured solid were measured using an electronic densimeter (SD-120L, product of Alfa Mirage Co., Ltd.), and the curing shrinkage ratio (%) was computed from the difference between the specific gravities using the equation below. The obtained results are shown in Table 3.

Curing shrinkage ratio (%)=(specific gravity of cured product−specific gravity of liquid resin)/(specific gravity of cured product)×100.  [Equation 2]

[Surface Roughness]

2 mg of Each resin composition was applied dropwise to a glass plate for a liquid crystal cell. Then, the strain (Ra: average surface roughness) in a predetermined area (2.93 mm×2.20 mm) on the glass plate surface caused by the internal stress during UV curing was measured using a three-dimensional non-contact surface roughness measuring apparatus (product of Zygo Corporation). The obtained results are shown in Table 3.

TABLE 3

| | Storage elastic modulus (Pa) | Curing shrinkage ratio (%) | Ra: average surface roughness (nm) |
|---|---|---|---|
| Resin composition a | $1 \times 10^6$ | 4.5 | 5.5 |
| Resin composition b | $1 \times 10^6$ | 4.5 | 5.5 |
| Resin composition c | $1 \times 10^4$ | 1.8 | 2.7 |
| Resin composition d | $4 \times 10^3$ | 1.0 | 1.5 |
| Resin composition e | $4 \times 10^5$ | 3.8 | 5.0 |
| Resin composition f | $2 \times 10^7$ | 5.6 | 12.4 |
| Resin composition g | $3 \times 10^8$ | 4.3 | 36.5 |
| Resin composition h | $5 \times 10^8$ | 5.6 | 64.2 |

As is clear from Table 3, for the resin compositions a to e, the results were satisfactory. More specifically, the storage elastic modulus was $4 \times 10^3$ to $1 \times 10^6$ Pa, and the curing shrinkage ratio was 1.0 to 4.5%. Therefore, the average surface roughness Ra was 1.5 to 5.5 nm, meaning almost no strain occurred. However, for the resin composition f (Ra=12.4 nm), the resin composition g (Ra=36.5 nm), and the resin composition h (Ra=64.2 nm), Ra was large. This indicates that the interface between the resin and the glass plate was deformed due to the internal stress during curing of the resin. Therefore, when such a resin composition is used to fill the gap between the base and the protection member and is cured, the interfaces with the image display unit and with the protection member are deformed, so that the problem of image distortion cannot be eliminated.

INDUSTRIAL APPLICABILITY

The present invention is useful for manufacturing an image display device such as a liquid crystal display device.

The invention claimed is:

1. A method for manufacturing an image display device, the method comprising the step of forming a cured resin layer by interposing a photo-curable resin composition between a base including an image display unit and a light-transmitting protection member including a light-shielding member and then photo-curing the photo-curable resin composition, wherein
a resin composition including an acrylic monomer, a photo polymerization initiator, and one of an oligomer and a polymer, having a curing shrinkage ratio in the range of 1.0 to 4.5%, yielding a cured product having a storage elastic modulus at 25° C. of $4 \times 10^3$ to $1 \times 10^6$ Pa, and forming the cured resin layer having a light transmittance of 90% or more in a visible range is used as the photo-curable resin composition, wherein
the method further comprises the step of interposing a curable resin composition containing a thermal polymerization initiator including an organic peroxide at least between the light-shielding member and the base and heating the curable resin composition, and wherein
the curable resin composition containing the thermal polymerization initiator and interposed between the light-shielding member and the base is the photo-curable resin composition.

2. A method for manufacturing an image display device, the method comprising the step of forming a cured resin layer by interposing a photo-curable resin composition between a base including an image display unit and a light-transmitting protection member including a light-shielding member and then photo-curing the photo-curable resin composition, wherein
a resin composition including an acrylic monomer, a photo polymerization initiator, and one of an oligomer and a polymer, having a curing shrinkage ratio in the range of 1.0 to 3.8%, yielding a cured product having a storage elastic modulus at 25° C. of $1 \times 10^4$ to $4 \times 10^5$ Pa, and forming the cured resin layer having a light transmittance of 90% or more in a visible range is used as the photo-curable resin composition, wherein
the method further comprises the step of interposing a curable resin composition containing a thermal polymerization initiator including an organic peroxide at least between the light-shielding member and the base an heating the curable resin composition, wherein
the photo-curable resin composition interposed between a non-light-shielding portion of the protection member and the base does not contain a thermal polymerization initiator, and wherein the photo-curable resin composition containing the thermal polymerization initiator and interposed between the light-shielding member and the base is irradiated with light and heated.

3. The manufacturing method according to claim 1, wherein the curable resin composition interposed between the light-shielding member and the base has a curing shrinkage ratio of 1.0 to 4.5% and yields a cured product having a storage elastic modulus at 25° C. of $4 \times 10^3$ to $1 \times 10^6$ Pa.

4. The manufacturing method according to claim 1, wherein the cured resin layer has a thickness of 50 to 200 μm.

5. The manufacturing method according to claim 2, wherein the photo-curable resin composition interposed between the light-shielding member and the base is irradiated with rays of light from an outer side surface with respect to a forming surface of the light-shielding member.

6. The manufacturing method according to claim 1, wherein the photo-curable resin composition contains at least one of an oligomer and a polymer selected from the group consisting of a polyurethane acrylate, a polyisoprene acrylate, an esterified product thereof, a hydrogenated terpene resin, and a butadiene polymer; at least one acrylate monomer selected from the group consisting of an isobornyl acrylate, a dicyclopentenyloxyethyl methacrylate, and a 2-hydroxybutyl methacrylate; and a photo polymerization initiator.

7. The manufacturing method according to claim 1, wherein the image display unit is a liquid crystal display panel.

8. The manufacturing method according to claim 1, wherein the protection member is made of an acrylic resin.

9. The manufacturing method according to claim 1, wherein an average surface roughness of a cured product obtained by applying dropwise 2 mg of the resin composition to a glass or acrylic plate and curing the applied resin composition with UV rays is 5.0 nm or less.

* * * * *